United States Patent [19]

Nesmith

[11] Patent Number: 4,547,121
[45] Date of Patent: Oct. 15, 1985

[54] SELF-LOCKING TELESCOPING MANIPULATOR ARM

[75] Inventor: Malcolm F. Nesmith, Huntsville, Ala.

[73] Assignee: The United States of America as represented by the Administrator of the National Aeronautics and Space Administration, Washington, D.C.

[21] Appl. No.: 537,757

[22] Filed: Sep. 30, 1983

[51] Int. Cl.⁴ ............................................. B25J 15/00
[52] U.S. Cl. .................... 414/753; 901/31;
901/25; 414/718; 414/4; 212/230
[58] Field of Search .................... 52/111, 116, 117;
212/230, 231, 264, 267–269; 414/729, 753, 730,
718, 4, 5, 1; 901/15–18, 36, 25, 30, 31, 32, 38,
39, 41, 50

[56] References Cited

U.S. PATENT DOCUMENTS

| 2,861,701 | 11/1958 | Bergsland et al. | 901/15 X |
| 3,144,947 | 8/1964 | Pittwood | 414/730 |
| 4,395,192 | 7/1983 | Schafly | 414/718 |

FOREIGN PATENT DOCUMENTS

| 1363431 | 5/1964 | France | 901/36 X |
| 927486 | 5/1982 | U.S.S.R. | 901/31 X |

Primary Examiner—Terrance L. Siemens
Attorney, Agent, or Firm—Joseph H. Beumer; John R. Manning; Leon D. Wofford, Jr.

[57] ABSTRACT

A telescoping manipulator arm and pivotable finger assembly are disclosed. The telescoping arm assembly (A) includes a generally T-shaped arm (18) having three outwardly extending fingers (18a, 18b, 18c) guided on the grooved roller guides (12, 14, 16) to compensate for environmental variations. The pivotable finger assembly (D) includes four pivoting fingers (50, 66, 70, 74). Arcuate teeth (52, 58, 60, 62) are formed on the ends of the fingers. A rack (54) having teeth on four sides meshes with each one of the fingers. One surface of the rack (54) includes teeth (56) along its entire surface which mesh with teeth (52) of the finger (50). The teeth (56) at the remote end of the rack (54) engage teeth (80) of a gear wheel (81). The wheel (81) includes a worm (82) which meshes with a worm drive shaft of the drive motor (86) providing a ninety degree self-locking drive (E) for locking the fingers in a desired position. A similar drive (C, 40, 42) provides a self-locking drive for positioning the telescoping arm (18).

18 Claims, 5 Drawing Figures

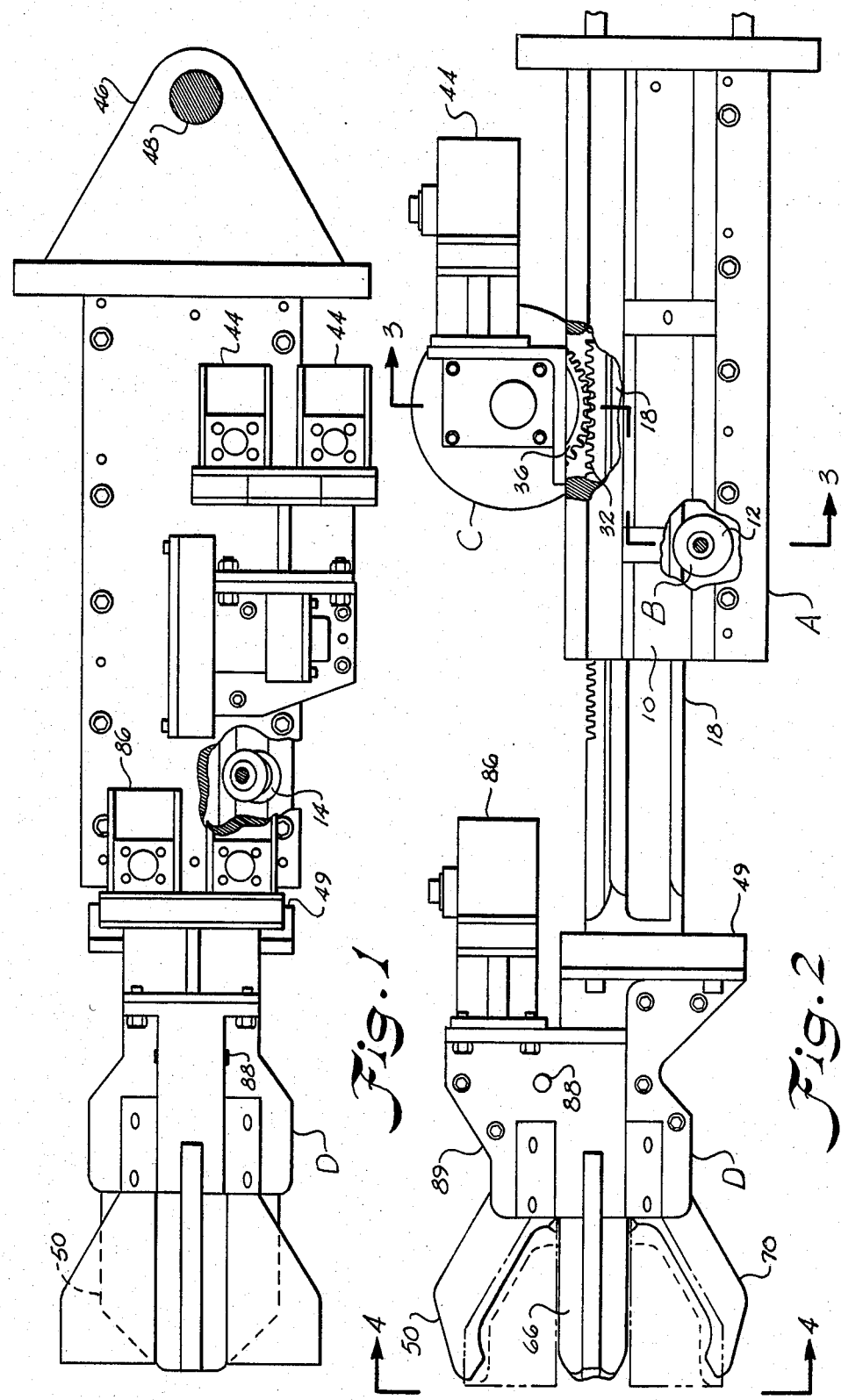

SELF-LOCKING TELESCOPING MANIPULATOR ARM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

In many applications in space, it is necessary to grasp a mechanial object and manipulate it into a desired position by means of remote control. In particular, there are many maneuvers inside the cargo bay of space vehicles such as the space shuttle which have special requirements for manipulator arms. Typically, in the payload bay, there is a gimbal system on which a payload is mounted and trunions on which the payload is supported during launch. During maneuvers, the payload bay may be opened and the payload may be gimballed and pointed in a desired direction. After the desired maneuver is carried out in space, the payload which, for example, may be a telescope, must be refastened in the payload bay for storage. It is necessary then to grasp the payload and manipulate it into the trunion supports which are carried on the pallet of the payload bay to lock the payload in storage position.

Typically, there is a ball on the payload gimbal support by which the payload may be maneuvered. It is desirable to be able to grasp the ball and manipulate the payload into a position wherein the trunions carried on the payload are placed into trunion supports whereby the trunions are thereafter clamped and firmly held in the storage position.

Heretofore, detect couplings have been utilized to center the payload and lock it positively in the storage bay. Step motors are utilized to place the detent couplings into engagement with one another by moving the payload in a step-wise manner. However, this method is not always reliable for centering the payload as desired.

Various drives have been heretofore proposed for manipulator arms such as disclosed in U.S. Pat. Nos. 4,068,763, 3,904,234, and 3,481,493.

Accordingly, an important object of this invention is to provide a centering manipulator arm which will positively grasp the payload and bring it into the desired storage position without guess or need of stepping the payload into position of a detent coupling.

Still another important object of the present invention is to provide a mechanical manipulator arm for grasping a payload and centering it in a storage position in a bay of a shuttle vehicle.

Still another important object of the present invention is to provide a telescoping manipulator arm having a track system for guiding and varying the effective length of the arm in a linear motion wherein the track system compensates for variations in environmental conditions and frictional changes.

Still another important object of the present invention is to provide a self-locking drive system for a reciprocating manipulating arm and pivoting fingers carried thereon which positively locks the fingers and arm in a desired position.

SUMMARY OF THE INVENTION

The above objectives are accomplished according to the present invention by providing a telescoping manipulator arm for centering the payload which includes a triple track roller drive system which allows reciprocation of the arm and compensates for environmental and temperture changes. The remote end of the arm carries a pivoting finger assembly which can positively grasp a spherical trunion attached to the gimbal boom by which the payload is carried. By positively grasping the spherical trunion, the fingers of the manipulator arm close upon the ball to self-center the payload and bring it into alignment for storage.

The pivoting finger assembly mechanism includes a unique drive for pivoting the fingers which includes a motor having a worm drive shaft, and a worm drive shaft which meshes with a worm gear carried on a shaft. Also carried on the worm gear and spaced circumferentially from the worm gear on the shaft is a plurality of teeth which engage with teeth of a rack. The other end of the rack engages with teeth carried on the pivoting fingers. As the motor and worn turn, the worm gear turns to reciprocate the rackby engagement with the teeth thereon. Reciprocation of the rack causes opening and closing of the pivoting fingers. When the motor is stopped, the drive system is self-locking in that the worm and worm gear are interlocked in meshing engagement and no relative movement therebetween is permitted such that the drive system is locked and the fingers are locked in position.

The ninety degree arrangement of the worm and worm gear with respect to the teeth meshing with the rack gear provide positive locking of the pivoting finger assembly. In this manner, the spherical trunion may be grasped with the fingers which close upon the spherical trunion to positively grip and center the payload storage.

The arm itself telescopes for positioning the payload. The roller track system for the telescoping arm includes a generally "T-shaped arm which reciprocates and carries the pivoting finger assembly on one end thereof. The "T-shaped arm is carried at three of its pointed fingers by V-grooved rollers and engages a drive gear at a top arm surface. The drive gear is driven by a worm drive shaft which meshes with a worm gear on the drive gear. A self-locking ninety degree drive is then provided for the reciprocation of the telescoping arm which locks the arm in any selected position.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is an elevation of a telescoping manipulator arm constructed according to the invention, FIG. 2 is a elevation illustrating a telescoping manipulator arm according to the invention with the arm partially extended and parts cut away for clarity.

DESCRIPTION OF A PREFERRED EMBODIMENT

A mechanical self-locking telescoping manipulator arm is disclosed for grasping and maneuvering an object which includes a main housing adapted to be attached to an associated structure having a cantilevered housing extending outwardly therefrom. A telescoping arm assembly A is included in the housing having a telescoping arm slidably carried by the cantilevered housing. There is a temperature compensating track system B carried within the cantilevered housing for guiding the telescoping arm during telescoping movements and compensating for temperature changes and resulting frictional changes due to unknown environmental changes in use. The track system includes a plurality of roller track guides contacting and guiding the telescoping arm at spaced points about its periphery and length.

There is a drive track carried by the reciprocating arm and a self-locking ninety degree drive C for driving the telescoping arm via the drive track to and fro in reciprocating telescoping motion. The ninety degree drive positively locks the reciprocating arm in a longitudinal position. The telescoping arm drive includes a motor carried by the cantilevered housing having a motor drive shaft, and a second drive shaft driven by the motor drive shaft carried by the housing perpendicular to the motor drive shaft. A worm is carried on the motor drive and there is a worm wheel carried on the driven drive shaft meshing with the worm. A drive is carried by the driven drive shaft meshing with the track drive on the telescoping arm.

A pivoting finger assembly D is carried on a free end of the telescoping arm which includes a plurality of pivoting fingers carried on pivot shafts wherein each finger has an arcuate portion on which gear teeth are formed. There is a rack gear having a plurality of rack surfaces with gear teeth formed thereon meshing with individual ones of the pivoting fingers. A driven shaft is carried by the assembly housing, and a gear wheel is carried on the driven shaft having a drive gear meshing with the gear rack. There is a worm gear formed on the gear wheel spaced circumferentially from the drive gear. A drive motor having a worm drive shaft is carried by the assembly housing meshing with the worm gear, and the worm drive shaft is perpendicular to the driven shaft and the pivot shafts of the pivoting fingers to provide a self-locking ninety degree drive E therebetween. The drive E locks the fingers in a pivot position and thereby firmly grip an object held therein. Means for mounting the cantilevered housing to an associated structure is provided.

Figure 3:
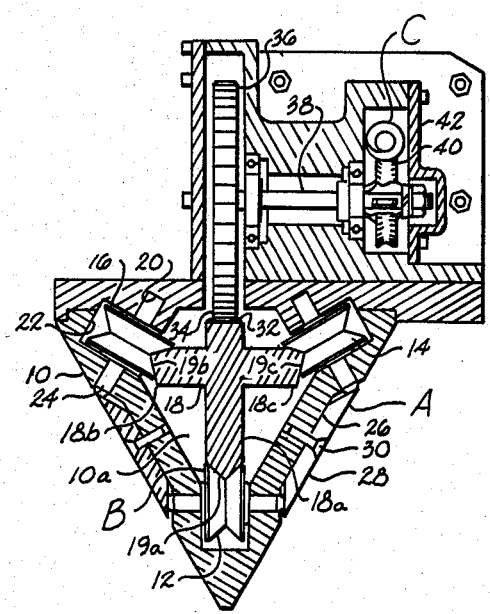
FIG. 3 is a sectional view taken along line 3—3 of FIG. 2.

Referring now in more detail to the drawings, it can be seen from FIGS. 1-3 that the telescoping arm assembly A includes a triangular cantilevered housing 10 having three V-roller track guides 12, 14, and 16 carried in the apex portions of an open triangular channel 10a formed in the housing. The roller track guides are carried at the forward end of the arm and a corresponding number of V-track pulley wheels are carried in the apexes of the channel toward the rear of the housing to hold a generally "T" or cross-shaped arm 18 for reciprocating longitudinal movement within the housing 10.

In construction, as can best be seen in FIG. 3, the triangular housing 10 includes a plurality of blind recesses 20. The roller wheels 12-16 are placed in recesses 22 and a pivot pin 24 is then inserted through the roller into the blind recesses 20. There is a cut-out 26 formed in the triangular housing by which the pivot pins 24 may be inserted. After the pins are inserted and the wheels are positioned as desired, removable cover lock plates 28 are then inserted in the cut-outs 26 and screwed in place by means of screws 30 such that the pins and rollers are locked in position. The cross-shaped arm 17 includes three fingers 18a, 18b, 18c having contoured end portions 19a, 19b, 19c which fit within the V-grooves of the rollers as illustrated.

The top surface 18d of the arm 18 includes rack teeth 32 formed therein which mesh with teeth 34 of a spur gear wheel 36. The spur gear 36 is carried on a driven drive shaft 38. The other end of the shaft 38 carries a worm gear 40 which is in meshing engagement with a worm drive shaft 42 of a drive motor 44. By this means the self-locking drive C for the telescoping arm is provided.

The triangular housing 10 may be secured to a suitable fixture in the payload bay by suitable attachment means in the form of an attachment bracket 46 having an opening 48 which may receive a clevis pin (FIG. 1).

Figure 4:
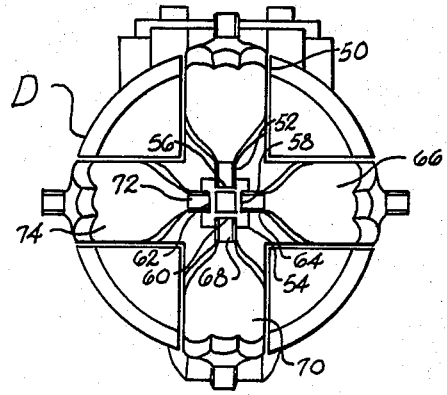
FIG. 4 is an end view of a pivotable finger assembly carried at the end of a telescoping manipulator arm constructed according to the invention.
Figure 5:
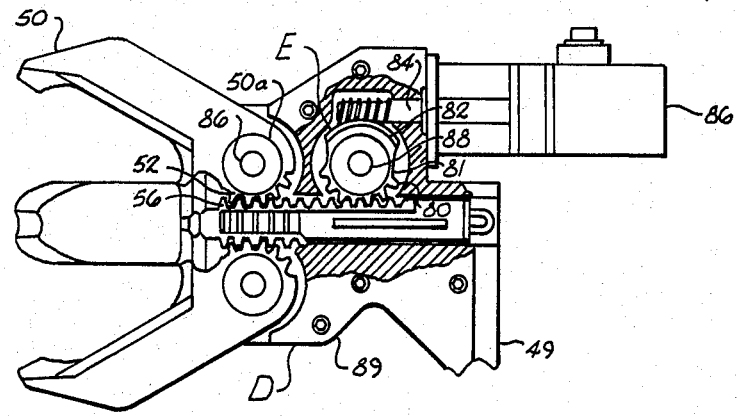
FIG. 5 is a partially cut-away elevation illustrating a pivotable finger assembly constructed according to the invention.

Referring now to FIGS. 4-5, the opposing end of the telescoping shaft 18 includes a flange 49 to which is attached the pivoting finger assembly D. The pivoting finger assembly D includes in the illustrated embodiment four fingers which pivot, such as finger 50. The fingers are shaped so as to grasp the spherical trunion and center it among the fingers. The opposing end of fingers 50 includes gear teeth 52 covering approximately 160 degrees of the circumference of an arcuate portion 50a. There is a rack gear 54 carried in the assembly which has four gear toothed racks with gear teeth at 56, 58, 60, and 62.

The teeth 56 of the racks are in mesh with the teeth 52 of the finger 50. There are three more fingers 66, 70, and 74 identical to finger 50 and all four fingers are spaced ninety degrees from each other. Fingers 66, 70, 74 carry arcuate teeth 64, 68, 72, respectively. Teeth 64 of finger 66 are in engagement with teeth 58 of the rack. Teeth 68 of finger 70 are in mesh with the teeth 60 of the rack and teeth 72 of finger 74 are in mesh with teeth 62 of the rack. Accordingly, upon reciprocation of the rack all four fingers are either pivoted clockwise or counterclockwise in synchronization.

As can best be seen in FIG. 5, teeth 56 extend along the entire length of gear rack 54 and thus provide main gear teeth. The opposite end of the remote end of gear teeth 56 is in engagement with teeth 80 which form part of a composite gear wheel 81 which includes a worm gear 82 around a portion of its circumference opposite the gear teeth 80. The worm gear 82 is in mesh with a worm drive shaft 84 of motor 86. Drive shaft 84 and driven shaft 88 on which gear wheel 81 is affixed are perpendicular. In this manner, self-locking drive means E is provided for the pivoting of the fingers 50, 66, 70 and 74 by which the fingers may be locked in any desired pivoted position in synchronization. All of the shafts such as shaft 86 and shaft 88 of the finger 50 and th gear 81 are suitably carried in an assembly housing 89 forming part of the pivoting finger assembly D.

Thus, a unique ninety degree locking drive system is provided for the pivoting fingers and the telescoping arm provided by the worm drive shaft 42, worm gear 40 and spur drive gear 36 affixed on driven shaft 38 perpendicular to worm drive 42.

While a preferred embodiment of the invention has been described using specific terms, such description is for illustrative purposes only, and it is to be understood that changes and variations may be made without departing from the spirit or scope of the following claims.

What is claimed is:

1. A mechanical telescoping manipulator arm for grasping and maneuvering an object comprising:
   (a) a main housing adapted to be fixed to an associated structure;
   (b) a telescoping arm slidably carried by the housing;
   (c) a pivoting finger assembly carried on a free end of said telescoping arm which includes:
   (i) an assembly housing,
   (ii) a plurality of pivot shafts carried by said assembly housing,
   (iii) a pivoting finger carried on each pivot shaft having gear teeth carried on an arcuate portion thereof,
   (iv) a rack gear slidably carried by said assembly housing having a plurality of toothed racks with gear teeth formed thereon meshing with the gear teeth of respective ones of said pivoting fingers,
   (v) a driven shaft carried by said assembly housing,
   (vi) a drive wheel carried on said driven shaft having a drive gear meshing directly with gear teeth of said toothed racks,
   (vii) a worm gear carried on said driven shaft,
   (viii) a drive motor carried by said assembly housing having a worm drive shaft meshing directly with said worm gear, and
   (ix) said worm drive shaft being carried by said assembly housing perpendicular to said driven shaft and said pivot shafts to provide a ninety-degree self-locking drive limiting movement between said motor drive shaft, said driven shaft, and said rack gear to positively lock and hold said fingers in a pivot position and thereby firmly grip an object held by said fingers;
   (d) drive means connected to said telescoping arm for reciprocating said arm to and fro relatively to said main housing; and
   (e) means for mounting said main housing to an associated structure.

2. The apparatus of claim 1 wherein said pivoting finger assembly includes four pivoting fingers and said rack gear includes four toothed racks having rack teeth formed thereon which mesh with a respective one of said fingers for pivoting said fingers about said pivot shafts, said rack gear having a main set of rack teeth which mesh both with teeth of one of said pivoting fingers and with said drive gear of said drive wheel, whereby said fingers may be pivoted simultaneously and synchronization with each other upon driving of said rack gear by said drive wheel and locked in a desired pivoted position in synchronization with each other.

3. The apparatus of claim 1 wherein said worm gear and said drive gear are both formed on the same gear wheel.

4. The apparatus of claim 1 wherein said drive motor for said worm drive shaft is carried by said assembly housing at the free end of said telescoping arm.

5. A mechanical telescoping self-locking manipulator arm comprising:
   (a) a main housing;
   (b) a telescoping arm carried by said main housing which reciprocates relative to said housing;
   (c) track means carried by said housing for slidably mounting said telescoping arm wherein said track means includes support means contacting said telescoping arms at a plurality of contact points spaced about the periphery of said telescoping arm to compensate for environmental variations and resulting frictional changes between said support means and said telescoping arm during telescoping movement of said arm and thereby compensate for changes in environmental conditions during use;
   (d) a track drive carried on a surface of said telescoping arm;
   (e) a drive motor carried by said main housing having a motor drive shaft;
   (f) a second drive shaft driven by said motor drive shaft carried by said housing perpendicular to said motor drive shaft for driving said track drive; and
   (g) a self-locking ninety-degree drive connecting said motor drive shaft and said second drive shaft so that when said motor is stopped said drive track of said telescoping arm is locked and said telescoping arm is locked in place; said self-locking drive including:
   (i) a worm carried on said motor drive shaft,
   (ii) a worm wheel carried on said second drive shaft meshing with said worm, and
   (iii) a drive gear carried by said second drive shaft spaced from said worm wheel meshing with said track drive.

6. The apparatus of claim 5 comprising:
   (a) said main housing including an elongated cantilevered housing having an open interior channel;
   (b) said telescoping arm being slidably carried in said open channel of said cantilevered housing having a plurality of contoured fingers;
   (c) a plurality of roller track guides carried in said open channel slidably engaging said fingers of said telescoping arm at said spaced peripheral contact points; and
   (d) said telescoping arm being guided by said roller track guides at said spaced peripheral finger contact points during reciprocating movement.

7. The apparatus of claim 6 wherein said open channel of said cantilevered housing includes a triangular-shaped channel having well-defined apex portions;
   (a) said telescoping arm having a generally T-shaped configuration defined by three outwardly extending fingers;
   (b) a V-shaped groove formed in a circumference of each of said roller track guides; and
   (c) said fingers of said T-shaped arm having a contoured end portion received in one of said roller track guide grooves by which said telescoping arm is guided during reciprocation.

8. The apparatus of claim 7 wherein said T-shaped telescoping arm includes a top horizontal surface, said track drive including a rack of gear teeth carried along a portion of the length of said top surface of said telescoping arm by which said arm is reciprocated and locked in place.

9. The apparatus of claim 7 wherein said cantilevered housing includes:

(a) a triangular housing having three sides, a number of said sides including a removable plate which may be removed therefrom;

(b) a pair of recesses formed in each side of said triangular housing and recesses of intersecting sides being opposed and in alignment with each other for receiving a pivot pin;

(c) said roller guide tracks being received in the apex portion of the triangular channel within said triangular housing and being carried about a pivot pin received in the opposing recesses between intersecting sides of said triangular housing.

10. The apparatus of claim 9 wherein said removable plates leave exposed the said recesses for said pivot pins when removed so that said pivot pins may be inserted and removed by removing said removable plates and said roller track guides be removed and replaced accordingly.

11. A mechanical self-locking telescoping manipulator arm for grasping and maneuvering an object comprising:

(a) a main housing adapted to be attached to an associated structure;

(b) a cantilevered housing included in said main housing extending outwardly therefrom;

(c) a telescoping arm slidably carried by said cantilevered housing;

(d) a temperature compensating track system carried by said cantilevered housing for guiding said telescoping arm during telescoping movements and provide compensation for temperature changes and resulting frictional changes due to unknown environmental changes in use;

(e) said track system including a plurality of roller track guides contacting and guiding said telescoping arm at spaced fingers about its periphery and length;

(f) a drive track carried by said reciprocating arm;

(g) a self-locking, ninety-degree drive for driving said telescoping arm to and fro in reciprocating telescoping motion which positively locks said reciprocating arm in a longitudinal position wherein said self-locking drive includes:

(i) a motor carried by said cantilevered housing having a motor drive shaft, (ii) a second drive shaft driven by said motor drive shaft carried by said housing perpendicular to said motor drive shaft, (iii) a worm carried on said motor drive shaft, (iv) a worm wheel carried on said second drive shaft meshing with said worm, and (v) a drive gear carried by said second drive shaft meshing with said track drive, (h) a pivoting finger assembly carried on a free end of said telescoping arm which includes:

(i) a plurality of pivoting fingers carried on pivot shafts, each said finger having an arcuate portion on which gear teeth are formed, (ii) a rack gear having a plurality of rack surfaces with gear teeth formed thereon meshing with individual ones of said pivoting fingers, (iii) a drive shaft carried by said assembly housing, (iv) a gear wheel carried on said driven shaft having a drive gear meshing directly with said gear rack, (v) a worm gear formed on said gear wheel with said drive gear, (vi) a drive motor having a worm drive shaft carried by said assembly housing meshing directly with said worm gear, and (vii) said worm drive shaft being perpendicular to said driven shaft and said pivot shaft of said pivoting fingers to provide a self-locking ninety-degree drive directly limiting movement between said worm drive shaft and said rack gear for locking said fingers in a pivot position and thereby firmly grip an object held therein;

(i) means for mounting said cantilevered housing to an associated structure.

12. The apparatus of claim 11 wherein said pivoting finger assembly includes four pivoting fingers arranged in pairs where the pivoting fingers of each pair oppose one another.

13. The apparatus of claim 12 wherein said rack gear includes four racks having gear teeth meshing with one each of said four pivoting fingers, one of said racks being a main drive rack which meshes with a pivoting finger and with said drive gear simultaneously such that said pivoting fingers are pivoted in synchronization with one another and are locked in synchronization with one another to firmly grip said object.

14. The apparatus of claim 11 including:

(a) said cantilevered housing is triangular shaped and includes a triangular open channel in which said telescoping arm is received;

(b) said roller track guides being carried in apex portions of said triangular channel;

(c) each of said roller track guides having a V-shaped groove therein; and (d) said reciprocating arm including a T-shaped arm having at least three main fingers wherein each of said fingers includes a contoured end portion received in said V-groove of said roller track guides by which said telescoping arm is guided during operation.

15. The apparatus of claim 14 wherein said T-shaped telescoping arm includes a top horizontal surface, said track drive including a rack having gear teeth carried along a portion of the length of said top surface which is engaged by said drive gear.

16. A self-locking finger assembly for grasping an object comprising:

(a) an assembly housing;

(b) a plurality of pivoting fingers carried on pivot shafts, each said finger having an arcuate portion on which gear teeth are formed;

(c) a rack gear having a plurality of rack surfaces with gear teeth formed thereon meshing with individual ones of said pivoting fingers;

(d) a driven shaft carried by said assembly housing;

(e) a gear wheel carried on said driven shaft having a drive gear meshing directly with said gear rack;

(f) said worm gear and drive gear integrally formed on said gear wheel as a unitary construction;

(g) a drive motor having a worm drive shaft carried by said assembly housing meshing with said worm gear;

(h) said worm drive shaft being perpendicular to said driven shaft and said pivot shaft of said pivoting fingers to provide a self-locking ninety degree drive therebetween for locking said fingers in a pivot position and thereby firmly grip an object held therein.

17. The apparatus of claim 16 wherein said pivoting finger assembly includes four pivoting fingers arranged in pairs where the pivoting fingers of each pair oppose one another.

18. The apparatus of claim 17 wherein said rack gear includes four racks having gear teeth meshing with one each of said four pivoting fingers, one of said racks being a main drive rack which meshes with a pivoting finger and with said drive gear simultaneously such that said pivoting fingers are pivoted in synchronization with one another and are locked in synchronization with one another to firmly grip said object.

* * * * *